US007391788B2

(12) United States Patent
Zhang et al.

(10) Patent No.: US 7,391,788 B2
(45) Date of Patent: Jun. 24, 2008

(54) METHOD AND SYSTEM FOR A THREE CONDUCTOR TRANSCEIVER BUS

(75) Inventors: Chenmin Zhang, Irvine, CA (US); Steve Thomas, Riverside, CA (US); Randall Stolaruk, Huntington Beach, CA (US)

(73) Assignee: Broadcom Corporation, Irvine, CA (US)

(*) Notice: Subject to any disclaimer, the term of this patent is extended or adjusted under 35 U.S.C. 154(b) by 1158 days.

(21) Appl. No.: 10/299,172

(22) Filed: Nov. 19, 2002

(65) Prior Publication Data

US 2004/0095952 A1 May 20, 2004

Related U.S. Application Data

(60) Provisional application No. 60/423,166, filed on Nov. 1, 2002.

(51) Int. Cl.
*H04L 12/40* (2006.01)

(52) U.S. Cl. ....................................... 370/438; 370/439

(58) Field of Classification Search ...................... None
See application file for complete search history.

(56) References Cited

U.S. PATENT DOCUMENTS 5,444,847 A * 8/1995 Iitsuka ...................... 710/107
5,696,994 A * 12/1997 Pang .......................... 710/64
5,878,234 A * 3/1999 Dutkiewicz et al. ......... 710/110
5,884,044 A * 3/1999 Marsanne et al. ........... 709/232
5,903,737 A * 5/1999 Han .......................... 710/100
7,149,838 B2 * 12/2006 Ervin ........................ 710/306

OTHER PUBLICATIONS

Phillips Semiconductors, The I2C-Bus Specification Version 2.1, pp. 1-46, Jan. 2000.*

Stoneking, System Level Design Considerations When Using I2CTM Serial EEPROM Devices, Microchip Technology Inc., pp. 1-3, 1999.*

* cited by examiner

*Primary Examiner*—Frank Duong
(74) *Attorney, Agent, or Firm*—McAndrews, Held & Malloy, Ltd.

(57) ABSTRACT

Aspects of the invention provide a method and system for a communication bus for resetting one or more devices connected to the bus. The transceiver bus (620) may include a single serial data line (616), a single serial clock line (614) and a single reset line (612). A status of a slave device coupled to the transceiver bus (620) may be determined by a master device. Based on the status of the slave device, the master device may execute a forced reset or a normal reset. In a case where a device may be unresponsive, the master device may execute a forced reset. Additionally, in a case where a device is responsive but requires resetting, the master device may execute a normal reset and selectively reset a slave device requiring reset.

14 Claims, 9 Drawing Sheets

METHOD AND SYSTEM FOR A THREE CONDUCTOR TRANSCEIVER BUS

CROSS-REFERENCE TO RELATED APPLICATIONS/INCORPORATION BY REFERENCE

This application makes reference to, claims priority to and claims the benefit of U.S. Provisional Patent Application Ser. No. 60/423,166 filed on Nov. 1, 2002.

The above stated application is incorporated herein by reference in its entirety.

BACKGROUND OF THE INVENTION

Certain embodiments of the invention relate to the communication of data and control signals. More specifically, certain embodiments of the invention relate to a method and system for a transceiver bus.

Communication systems such as embedded systems and/or multiprocessor systems may often have a large component count dependent on their functionality. In general, the greater the number of components the greater the number of data, address and/or controls lines that must be provided to control the components. Furthermore, additional devices such as multiplexers and decoders may be required to provide interconnectivity between devices wishing to communicate with each other. The address, data, and control lines along with the wiring required for additional devices may result in extensive wiring for a printed circuit board (PCB) or core. In some instances, using several layers on a PCB may help to alleviate the problem of excessive wiring. Although, it may be expensive to fabricate multi-layered PCBs, the use of multi-layered PCBs and excessive wiring may also pose certain other problems. For example, excessive wiring may result in electromagnetic interference and/or electrostatic discharge. Accordingly, a bus may be used to save cost and also eliminate and/or solve some of these problems.

A bus is a device interface having one or more conductors or optical fibers that may serve as a common connection for a plurality of devices connected thereto. The bus may be configured to provide intra-device communication to devices located on the bus or inter-device communication to other devices residing on other inter-connected communication buses. For example, a time division multiplexing (TDM) bus consists of a plurality of conductors in which signals are communicated over the time division multiplexed bus in a channelized manner called a timeslot. In this regard, a carrier signal communicated by the bus may be divided in a plurality predefined individual channels. Each time slot is a channel defined by a unique time interval in which data may be communicated on the bus. Each device located or connected to the bus may be assigned one or more of a unique time slot in which to communicate over the bus. Accordingly, dependent on a size of the bus, at least some or all of the devices connected to the bus may simultaneously communicate over the TDM bus. Although time division multiplexed buses may permit simultaneous device communication, they may be expensive to implement and are preferably employed in medium too large scale communication systems.

One less expensive alternative to a time division multiplexed bus is an inter-integrated circuit (IIC or $I^2C$) bus. The $I^2C$ bus is a serial interface that may be adapted to connect one or more communication devices coupled to the $I^2C$ bus. The $I^2C$ bus conforms to certain standards and specification that describe the protocols, signals and data formats, which are necessary for devices connected to the bus to communicate. The $I^2C$ bus has two (2) wire conductors, namely a first wire conductor, which may carry a serial data (SDA) signal, and a second wire conductor, which may carry a serial clock (SCL) signal. Each device connected to the $I^2C$ bus may require a unique address and may be configured to dynamically operate in either a master and/or slave communication mode. The mode of operation of a device may be dependent on its data transfer status.

FIG. 1 is a block diagram 100 of an exemplary $I^2C$ bus 120. Referring to FIG. 1, there is shown a bus controller 102, a plurality of devices 104, 106, 108, 110, a serial clock line (SCL) 114 and a serial data line (SDA) 116.

The bus controller 102 may be any suitable microprocessor, microcontroller or suitable specialized processor that may be adapted to control the communication of signals such as SCL 114 and SDA 116 over bus 120.

The devices 104, 106, 108, 110, may be any suitable device that may be connected to the bus 120. For example, devices 104, 106, 108, 110 may be a memory, a field programmable gate array (FPGA), a SoC (System On a Chip), an application specific integrated circuit (ASIC), a video controller, an audio controller, an analog-to-digital converter (ADC) and a digital-to-analog converter (DAC). Any of the devices 104, 106, 108, 110 may be adapted to operate in a master and/or slave mode. A device that may initiate a data transfer and generate one or more clock signals may be referred to a master device. Additionally, a device that may be adapted to receive data from a master device may be referred to as a slave device. In this regard, a master device may be adapted to operate as a slave when it receives data from another master device. Accordingly, a status of a device as a master device or a slave device may adaptively change during operation.

The SCL line 114 and the SDA 116 lines may be connected to a positive power supply, for example a +5V supply, which is driven by open collector drivers. In this regard, +5V may represent logic one (0) and a ground or 0V may represent a logic zero (0). Each of the devices 104, 106, 108, 110 are connected to the SDA line 116 and the SCL line 114 through a pull up resistor. In operation, the SCL signal on the SCL line 114 and SDA signal on the SDA line 116 remain logic one (1) or high unless driven to logic zero (0) or low by any one or more of the devices 104, 106, 108, 110. Since the SDA line 116 and the SCL line 114 are wired as an "AND" function, the signals on these lines will be logic one (1) or high if all the devices on bus 120 drive these signals at a logic one (1) or high.

The SDA line carries data values for one or more of the devices 104, 106, 108, 110. Accordingly, any one or more of the devices 104, 106, 108, 110 wishing to operate in a master mode should have the capability to drive and sense both the SCL signal on the SCL line 114 and SDA signal on the SDA line 116. Although any one or more of the devices 104, 106, 108, 110, may wish to operate as a master on the bus 120, a special arbitration sequence will be followed and only one of the devices will prevail and become a master on the bus 120 at any given instant. The SCL line 114 and SDA line 116 may be configured as bi-directional communication lines that may be suitable for communicating both the SCL clock signal and SDA data signal respectively in both directions along bus 120.

The $I^2C$ bus utilizes a predefined data transfer format. FIG. 2*a* is a diagram 200 of a data transfer format for an $I^2C$ bus operating in normal mode. Referring to FIG. 2, there is shown a start condition (S) 204, address (ADDR) 212, a read/write bit 214, an acknowledge (ACK) bit 216, a data byte 218, an ACK bit 220, a data byte 222, an ACK bit 224, a data byte 226, an ACK bit 228 and a stop bit 230.

The start condition (S) 204 is part of a start of communication procedure and may be used to initiate communication over bus 120. The first byte following the start condition (S) 204 contains the 7-bit address field (ADDR) 212 followed by a 1-bit read/write bit 214. The address field (ADDR) 212 specifies the unique address of the device that is being communicated with or the addressed device.

The read/write bit 214 specifies whether an operation is a read or a write operation. When the read/write bit 214 is logic one (1), this may signify a write operation in which the master may be adapted to operate in receive mode and the slave in transmit mode. When the read/write bit 214 is logic zero (0), this may signify a write operation in which the master may be adapted to operate in transmit mode and the slave in receive mode.

The acknowledge (ACK) bit 216 follows the read/write bit 214 and specifies the response from a device that has the corresponding ADDR 212 or the addressed device. In this regard, the ACK bit 216 acknowledges receipt of the last byte of received data. The data byte 218 may represent actual data being communicated followed by a corresponding acknowledgement (ACK) bit 220. Similarly, the data byte 222 may represent actual data being communicated followed by a corresponding acknowledgement (ACK) bit 224. The final data byte 226 may be followed by ACK bit 228. The stop bit (P) 230 which may signify the end of a transaction for a communication session may follow the ACK bit 228. In general, the stop bit (P) 230 follows the last acknowledgement (ACK) corresponding to the last data byte communicated over the bus 120 by a device.

Since any of the devices 104, 106, 108, 110, may operate in either a master and/or a slave mode, there are four possible operational modes. These modes of operation include the master device acting as a transmitter, the master device acting as a receiver, the slave device acting as a transmitter and the slave device acting as a receiver. In a case where the master device may be adapted to operate as a transmitter, the master device may generate the start condition (S) 204, the stop condition (P) 230 and the clock signal on the SCL line 114. Since the master device operates as the transmitter, it may write data to the SDA line 116. In a case where the master device may be adapted to operate as a receiver, the master device may generate the start condition (S) 204, the stop condition (P) 230 and the clock signal on the SCL line 114. Since the master device operates as the receiver, it may read data bytes from the SDA line 116 and accordingly generate the appropriate ACK signals to acknowledge receipt of the read data bytes.

In a case where the slave device may be adapted to operate as a transmitter, the slave device may write data to the SDA line 116. However, the slave device may have the capability to stretch any clock signals that are on the CLK line (SCL) 114 to achieve synchronization. Particularly, when the slave device operates as a transmitter, it may extend or stretch any low clock periods. Finally, in a case where the slave device may be adapted to operate as a receiver, the slave device may read data from the SDA line 116 and generate the appropriate ACK signals to acknowledge receipt of the read data bytes. Similarly, when the slave device operates as a receiver, it may extend or stretch any low clock periods to achieve synchronization.

FIG. 2*b* is a timing diagram 240 illustrating bit-level synchronization by a slave device. Referring to FIG. 2*b*, there is shown a serial data signal SDA (242), a serial clock signal (SCL) 244, a master device clock signal ($CLK_m$) 246 and a slave device clock signal ($CLK_s$) 248. A master device may generate the $CLK_m$ signal 246 requesting data from a slave device. In response the slave device operating as a receiver, may extend or stretch any low clock periods to achieve synchronization. In this regard, the slave device may achieve synchronization with the master device by stretching the $CLK_m$ signal 246 generated by the master device from time instant $t_{m1}$ to time instant $t_{s1}$. Similarly, the slave device may achieve synchronization with the master device by stretching the $CLK_m$ signal 246 generated by the master device from time instant $t_{m2}$ to time instant $t_{s2}$.

FIG. 2*c* is a timing diagram 240 illustrating byte-level synchronization by a slave device. Referring to FIG. 2*c*, there is shown a serial data signal (SDA) 262, a serial clock signal (SCL) 264, a master device clock signal ($CLK_m$) 266 and a slave device clock signal ($CLK_s$) 268. The serial data signal (SDA) 262 includes byte 0 followed by an acknowledgement (A) 270 and byte 1 followed by an acknowledgement (A) 272. A master device may generate the $CLK_m$ signal 266 requesting data from a slave device. In response, the slave device operating as a receiver, may extend or stretch any low clock periods to achieve synchronization. In this regard, the slave device may achieve synchronization with the master device by stretching the $CLK_m$ signal 266 generated by the master device from time instant $t_{m1}$ to time instant $t_{s1}$. Similarly, the slave device may achieve synchronization with the master device by stretching the $CLK_m$ signal 246 generated by the master device from time instant $t_{m1}$ to time instant $t_{s1}$.

Referring to FIG. 2*a*, in operation, a master device may initiate communication by writing the start condition (S) 204 on the data line 116 of bus 120. The start condition (S) may be followed by the unique 7-bit device address 212 of a receiver. The receiver may be adapted to be a slave device. The slave device may be configured to sense the SDA line 116 in order to detect its address on the bus 120. Upon detecting its address on the SDA line 116, the slave device may determine whether to read or write to the SDA line 116 based on the read/write bit 214. If the byte consisting of the 7-bit address field and the read/write bit is correctly received, the slave or receiver device may write the ACK 216 to the SDA line 116 to acknowledge receipt of the last received byte. If the read/write bit 214 is logic one (1), the slave is being requested to transmit data by placing the data to be transmitted on the SDA line 116. If the read/write bit 214 is logic zero (0), the slave is being requested to receive data from the data the SDA line 116 of data bus 120.

Subsequent to receiving the acknowledgement (ACK) 216 from the slave device, the master device may transmit a first byte of data 218. The data byte may be transmitted starting with the most significant bit (MSB) and ending with the least significant bit (LSB). Subsequent to receiving a corresponding acknowledgement (ACK) 220 from the slave device, the master device may then transmit a second data byte 222. The slave device will acknowledge data byte 222 with a corresponding acknowledgement (ACK) 224. The master device will continue to transmit data to the receiving slave device until the last data byte 226 is sent and acknowledged by the ACK 228. Upon receipt of the last ACK 228 sent by the receiving slave device, the transmitting master device sends a stop condition (P) 230 to terminate the transfer of data to the receiving slave device. The master may be configured to generate the stop condition (P) 230 by holding SCL at logic one (1) or high while toggling SDA from a logic zero (0) or low to a logic one (1) or high.

A device wishing to access bus 120 may not gain access to the bus 120 until the bus is in an idle state. In this regard, during a period between when a device sends a start condition 204 and a device sends a stop condition 230, another device may not make an attempt to gain control of bus 120. The $I^2C$ bus utilizes an arbitration mechanism to resolve contention for access to the bus 120. Any device residing on the bus 120 that may be adapted to generate a clock signal on SCL line 114 and which may initiate and terminate a data transfer may be referred to as a master device. Although any one or more of the device 104, 106, 108, 110, connected to bus 120 may be a master device, only one of these devices may be a master at any given time instant. Any device with which a master communicates maybe referred to as a slave device. Whenever two or more master devices attempt to gain access to the bus at the same time or when the bus is in use, the arbitration mechanism will determine which device has priority to access the bus 120.

In a case where two or more devices acting as masters attempt to gain access to the bus 120, the arbitration mechanism may grant access to a first device that generates a logic zero (0) or low on the SDA line 116 where a remaining portion of the other devices contending for the bus generate a logic one (1) or high. During arbitration, a master device may detect transmission by another master device on the SDA line 116 of bus 120 if during a logic one (1) or high, the master device outputs a logic one (1) and detects a logic zero (0) or low on the SDA line 116 of bus 120. In this case, the master device generating the logic one (1) may lose arbitration of the contention and will set the data output high in order to release SDA line 116. The losing device may subsequently attempt to gain access to the bus 120. The master device that is transmitting is the winning master device and will continue transmitting data on the SDA line 116 of the bus 120. It may be necessary for the losing device to determine the 7-bit address (ADDR) whenever the device loses arbitration. This might be particularly important in a case where arbitration occurs while the 7-bit address (ADDR) is on the SDA line 116 of bus 120 and the winning master device is addressing the losing device. If the losing device detects it own address in the bus when it loses arbitration, it must immediately switch to a slave receiving mode of operation.

FIG. 3 is a timing diagram 300 of an exemplary arbitration between two devices. Referring to FIG. 3, there is shown a serial clock signal 302, a serial data signal 304, an output signal for a first device (D1) 306 and an output signal for a second device (D2) 308. Devices D1 and D2 are two master devices contending for the bus 102. At time instant $t_a$, the output of device D1 is logic one (1) or high and the output of device D2 is logic zero (0). Since the bus 120 is wired "AND," and device D2 sends a logic zero (0), the contention will be arbitrated in favor of D2. D1 one will lose the arbitration since at time instant $t_a$, the output of device D1 is logic zero (0) or low.

FIG. 4 is a diagram 400 of data transfer format for an I$^2$C bus operating in low-speed mode. Referring to FIG. 4, there is shown a start condition (S) 404, a start byte 406, a dummy acknowledge bit (A) 408, a restart condition ($S_r$) 410, an address (ADDR) 412, a read/write bit 414, an acknowledge (ACK) bit 416, a data byte 418, an ACK bit 420, a data byte 422, an ACK bit 424, a data byte 426, an ACK bit 428 and a stop bit 330. The data transfer format for the low-speed operating mode may facilitate access to bus 120 bus by slower speed devices.

The start condition (S) 404 is part of a start of communication procedure and may be used to initiate communication over bus 120. The start condition (S) 404 may be similar to the start condition (S) 204 of FIG. 2*a*. The start byte 406 is 00000001 and signifies the start of communication by a master device. A dummy acknowledge bit (A) 408 follows the start byte 406. A restart condition ($S_r$) 410 follows the dummy acknowledge bit (A) 408. The addition of the start byte 406, the dummy acknowledge bit (A) 408 and the restart condition ($S_r$) provides additional time for slower devices to synchronize and transfer data over bus 120.

The next byte contains the 7-bit address field (ADDR) 412 followed by a 1-bit read/write bit 414. The address field (ADDR) 412 specifies the unique address of the device that is being communicated with or the addressed device. When the read/write bit 414 is logic one (1), this may signify a write operation in which the master may be adapted to operate in receive mode and the slave in transmit mode. When the read/write bit 414 is logic zero (0), this may signify a write operation in which the master may be adapted to operate in transmit mode and the slave in receive mode. The acknowledge (ACK) bit 416 follows the read/write bit 414 and specifies the response from a device that has the corresponding ADDR 412 or the addressed device.

The data byte 318 may represent actual data being communicated followed by a corresponding acknowledgement (ACK) bit 420. Similarly, the data byte 422 may represent actual data being communicated followed by a corresponding acknowledgement (ACK) bit 424. The final data byte 426 may be followed by ACK bit 328. The stop bit (P) 430 which may signify the end of a transaction for a communication session may follow the ACK bit 428. In general, the stop bit (P) 430 follows the last acknowledgement (ACK) corresponding to the last data byte communicated over the bus 120 by a device.

In operation, a slow speed master device may be adapted to send the start condition 404 followed by the start byte 406. A dummy acknowledge bit (A) 408 may be generated and sent to the master device. Upon receipt of the dummy acknowledge bit (A) 408, the master device may generate a restart ($R_s$) on the SDA line of bus 120 followed by the address of the slave device. The sending of the start condition 404, the start byte 306 and the restart condition ($S_r$) 410 provides additional time for the slow speed master device to synchronize and communicate over bus 120.

FIG. 5 is a timing diagram 500 illustrating timing parameters for an I$^2$C bus operating in normal mode. Referring to FIG. 5, there is shown various portions of a SDA signal 502 and a SCL signal 504. The following parameters are shown in FIG. 5: $t_{buf}$, $t_{hd:sta}$, $t_{hd:sta}$, $t_{low}$, $t_{high}$, $t_{su:sta}$, $t_{hd:dat}$, $t_{su:dat}$, $t_r$, $t_f$, and $t_{su:sto}$. The parameter $t_{buf}$ represent the idle time required by the bus after a current transmission and prior to the start of a new transmission. The parameter $t_{hd:sta}$ represents a hold time for a start condition. Accordingly, a first clock pulse may be generated after $t_{hd:sta}$. The parameter $t_{hd:sta}$ represents a hold time for a restart condition. The parameter $t_{low}$ represents a low clock period of SCL 504. The parameter $t_{high}$ represents a high clock period of SCL 504. The parameter $t_{su:sta}$ represents a setup time for a repeated start condition. The parameter $t_{hd:dat}$ represents the hold time for data. The parameter $t_{su:dat}$ represents a setup time for data. The parameter $t_r$ represents a rise time for both SDA 502 and SCL 504. The parameter $t_f$ represents a fall time for both SDA 502 and SCL 504. Finally, the parameter $t_{su:sto}$ represents a setup time for a stop condition.

The following table represents applicable maximum and minimum limits for each of the timing parameters shown in FIG. 5.

| Parameter | Min. Value | Max. Value | Unit |
|---|---|---|---|
| $t_{buf}$ | 105 | — | μs |
| $t_{hd:sta}$ | 365 | — | μs |

-continued

| Parameter | Min. Value | Max. Value | Unit |
|---|---|---|---|
| $t_{r:hd:sta}$ | 210 | — | μs |
| $t_{low}$ | 105 | 155 | μs |
| $t_{high}$ | 365 | 415 | μs |
| $t_{su:sta}$ | 105 | 155 | μs |
| $t_{hd:dat}$ | 0 | — | μs |
| $t_{su:dat}$ | 250 | — | ns |
| $t_r$ | — | 1 | μs |
| $t_f$ | — | 300 | μs |
| $t_{su:sto}$ | 105 | 155 | μs |

Although the $I^2C$ bus may be capable of performing peer-to-peer serial communication and may be fairly simple to implement, it is limited to communication speeds of approximately 400 Kbps, with typical operating speeds of about 100 Kbps. Furthermore, even though it lacks common logic signals such as a chip select (CS) and arbitration signals, it is not very adaptable to scaling. In this regard, it may be complex to increase the number of devices that may operate on the bus as well as the distance over which devices can communicate over the bus. Oftentimes, for various reasons, a device may enter an undesired state. However, there are no provisions in the $I^2C$ bus that may be utilized to restore such device to a desired state.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method for resetting at least one of a plurality of devices internally coupled in a communications system. The method may include the step of determining a status of at least one of the devices which may be coupled to the transceiver bus. The transceiver bus may have a single serial data line, a single serial clock line and a single reset line. At least a portion of the devices connected to the transceiver bus may be coupled to the single serial data line, the single serial clock line and the single reset line. If the status of at least one device indicates that the device is unresponsive, then a reset called a forced reset may be executed. In a case where the status of at least one device indicates that the device is responsive but nonetheless requires a reset, then a selective reset called a normal reset may be executed.

The step of determining a status of one or more of the devices may include configuring one of the devices coupled to the single serial data line, single serial clock line and single reset line to operate as a master device. The master device may be adapted to control a reset signal on the reset line to reset one or more of the devices. The master device may generate a reset signal and may toggle the reset line while the data line and the clock line are logic one (1) or high. In a case where a device is responsive but nevertheless requires resetting, an address of the device requiring resetting may be placed on the bus. The device requiring resetting may be instructed to read data from the data line. Accordingly, the reset signal may be toggled while the data line and the clock line are at logic one (1) or logic zero (0). Toggling the reset line may include transitioning the reset line from logic zero (0) or low to logic one (1) or high.

Another embodiment of the invention provides a system for resetting one or more devices internally coupled in a communications system. The system may include at least one determinator adapted for determining a status of one or more of the devices coupled to a transceiver bus. The transceiver bus may have a single serial data line, a single serial clock line and a single reset line. At least a portion of the devices connected to the transceiver bus may be coupled to the single serial data line, the single serial clock line and the single reset line. At least one resetter may be used to reset one or more of the devices coupled to the transceiver bus if the devices are unresponsive. The at least one resetter may also be adapted to selectively reset a particular device that is responsive but requires setting.

The determinator may include at least one configurer adapted to configure one of the devices coupled to the single serial data line, single serial clock line and single reset line to operate as a master device. The master device may be adapted to control a reset signal that may be communicated to the devices via the reset line. The master device may include a toggler which may toggle a logic value of the reset line while the data line and clock line are at logic one (1) or logic zero (0). The master device may include at least one controller for placing at least one device address on the data line whenever the master device determines that a device is responsive but, nonetheless requires resetting. The at least one controller may instruct the device to read data from data reset line. A toggler may toggle a logic value of the reset line while the data line and the clock line are at logic one (1) or high.

Another embodiment of the invention may include a transceiver bus having a single serial data line for communicating data signals between a plurality of devices coupled to the transceiver bus. The transceiver bus may include a single serial clock line coupled to each device connected to the transceiver bus. A single reset line may be coupled to at least a portion of the devices coupled to the single serial data line and the single serial clock line. One of the devices coupled to the transceiver bus may be adaptively configured as a master device. Accordingly, a remaining portion of the devices connected to the bus may be adaptively configured as slave devices.

These and other advantages, aspects and novel features of the present invention, as well as details of an illustrated embodiment thereof, will be more fully understood from the following description and drawings.

DETAILED DESCRIPTION OF THE INVENTION

Aspects of the invention provide a method and system for a communication bus for resetting one or more devices connected to the bus. The transceiver bus may include a single serial data line, a single serial clock line and a single reset line. A status of a slave device coupled to the bus may be determined by a master device. Based on the status of the slave device, the master device may execute a forced reset or a normal reset. In a case where a device may be unresponsive, the master device may execute a forced reset. In a case where a device is responsive but requires resetting, the master device may execute a normal reset and selectively reset a slave device requiring reset. The transceiver bus may be adapted for use, for example, in a physical layer (PHY) device that may be coupled to a plurality of other devices which may require an independent resetting means. Notwithstanding, the invention is not limited in that regard, and the bus may be utilized in other applications.

Figure 6:
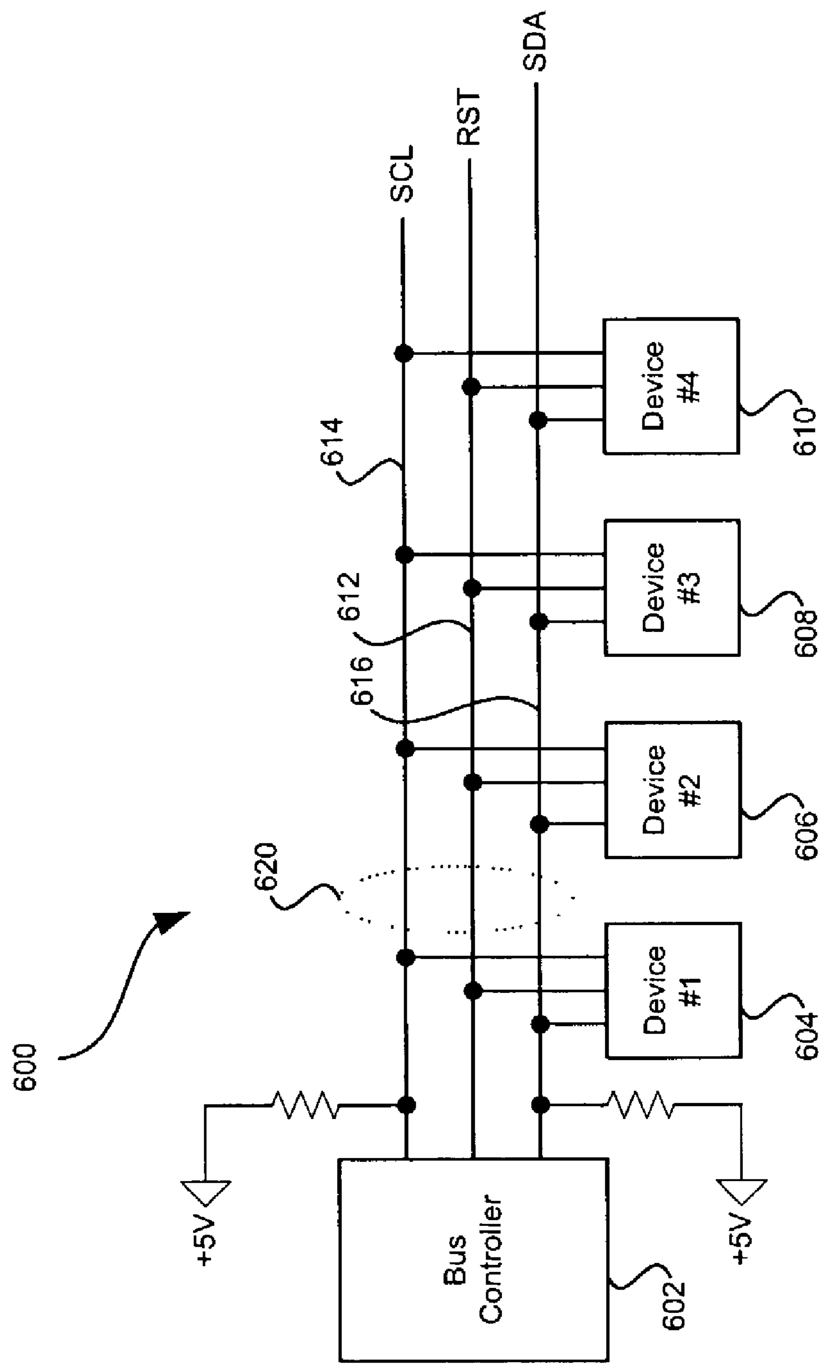
FIG. 6 is a block diagram of an exemplary bus in accordance with an embodiment of the invention.

FIG. 6 is a block diagram 600 of an exemplary bus in accordance with an embodiment of the invention. Referring to FIG. 6, there is shown a bus controller 602, a plurality of devices 604, 606, 608, 610, a reset line (RST) 612, a serial clock line (SCL) 614 and a serial data line (SDA) 616. The SCL line 614 and SDA line 616 may be configured as bi-directional communication lines that may be suitable for communicating both SCL clock signal and SDA data signals in both directions along bus 620.

The bus controller 602 may be any suitable microprocessor, microcontroller or other suitable specialized processor or controller that may be adapted to control the communication of an SCL signal on SCL line 614 and a SDA signal on SDA line 616 of bus 620. The devices 604, 606, 608, 610 may be any suitable device that may be connected to the bus 620. For example, devices 604, 606, 608, 610 may be a memory, a field programmable gate array (FPGA), a SoC (System On a Chip), an application specific integrated circuit (ASIC), a video controller, an audio controller, an analog-to-digital converter (ASC) and a digital-to-analog converter (DAC). Any of the devices 604, 606, 608, 610 may be adapted to operate in a master and/or slave mode. A device that may initiate a data transfer and generate one or more clock signals may be referred to a master device. Additionally, a device that may be adapted to receive data from a master device may be referred to as a slave device. In this regard, a master device may be adapted to operate as a slave when it receives data from another master device. Accordingly, a status of a device as a master device or a slave device may adaptively changed.

In one embodiment of the invention, a device acting as a master may be adapted to operate in a normal reset mode. In the normal reset mode of operation, the device acting as a master may selectively reset one or more of the devices connected to bus 620. In an alternative embodiment of the invention, a device acting as a master may be adapted to operate in a forced reset mode. In the forced reset mode of operation, the device acting as a master may reset all other devices connected to bus 620. The normal reset mode may be utilized in a case where a slave device may be in an undesired state, but may still be able to at least monitor the bus 620 and/or respond to its own address being placed on the bus 120. The forced reset mode may be utilized in a case where a slave device may be in an undesired state where it may be unable to at least monitor the bus 620 and/or respond to its own address being placed on the bus 620. In this case, it may be necessary to reset all the devices on the bus 620 to a known state.

Figure 1:
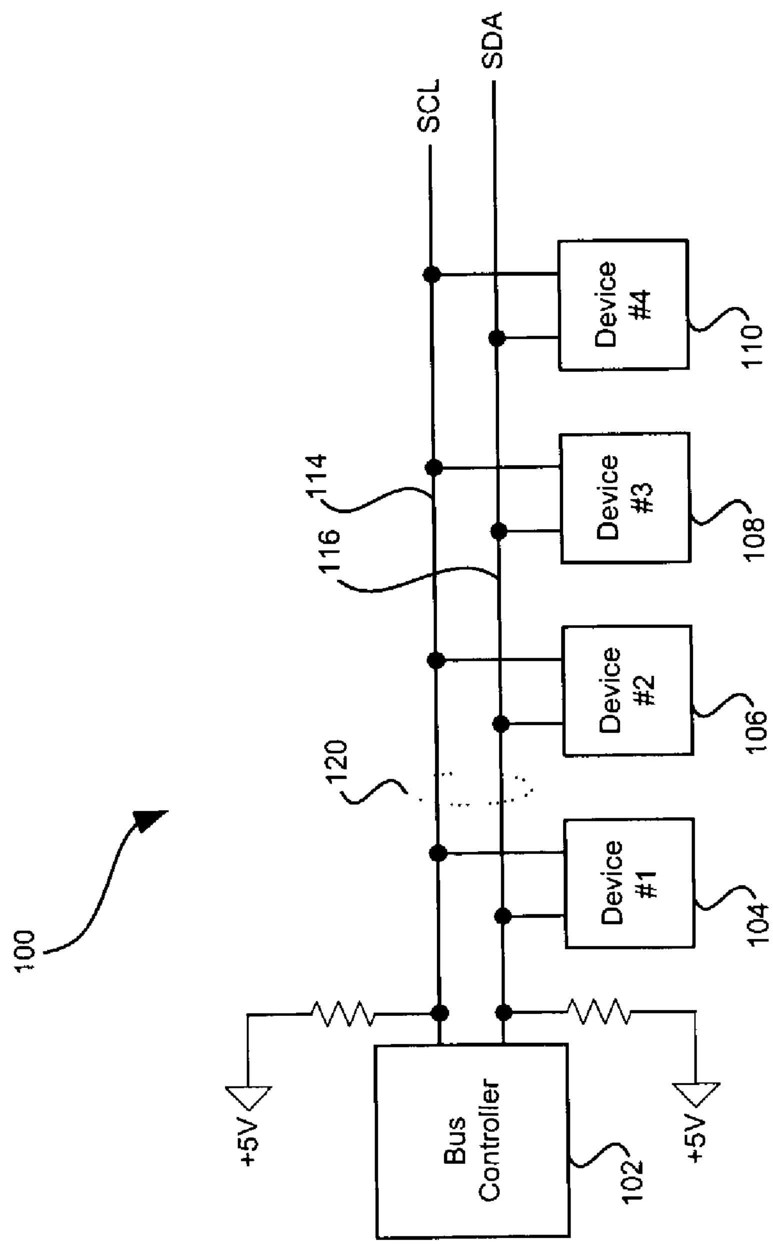
FIG. 1 is a block diagram of an exemplary $I^2C$ bus 120.
Figure 2A:
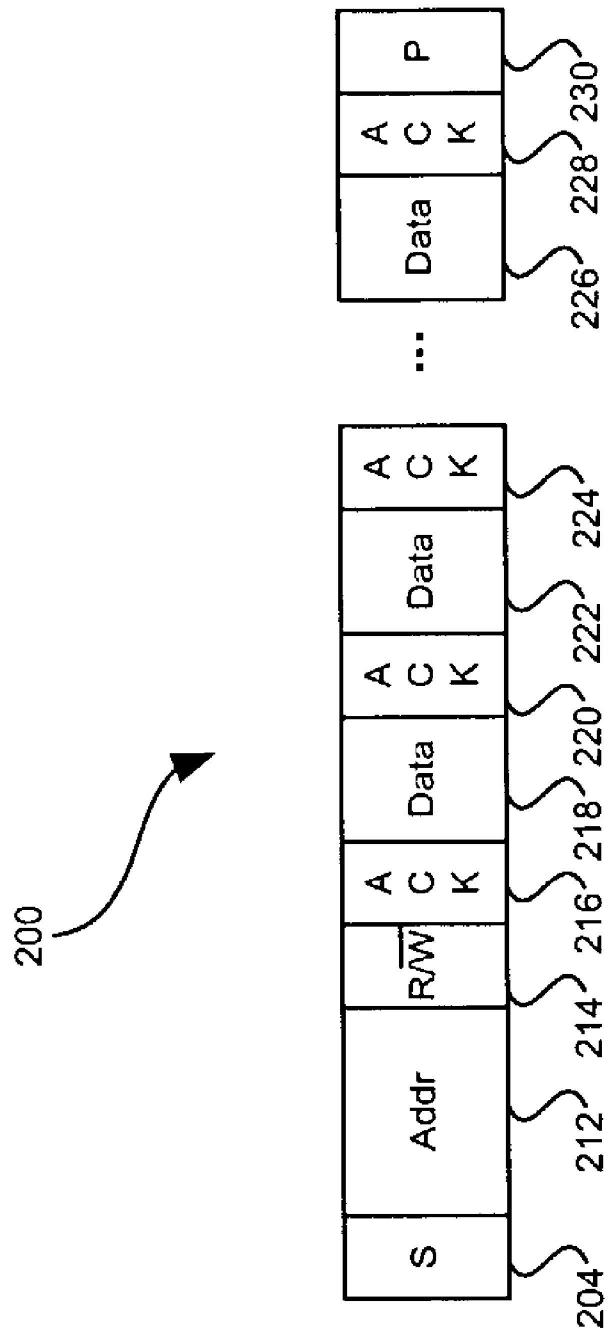
FIG. 2*a* is a diagram of data transfer format for an $I^2C$ bus operating in normal mode.
Figure 2B:
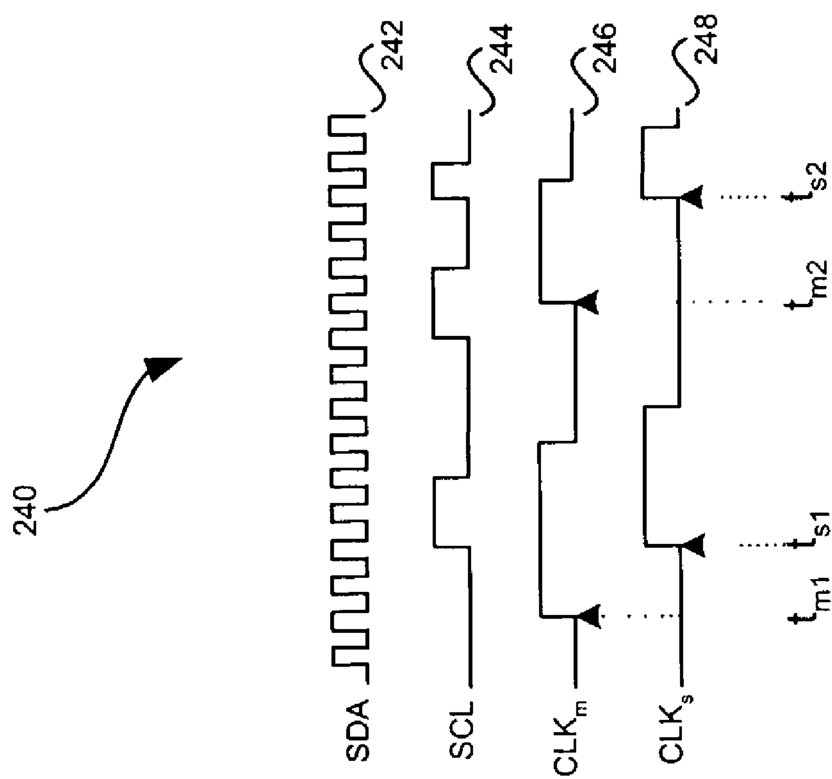
FIG. 2*b* is a timing diagram illustrating bit-level synchronization by a slave device.
Figure 2C:
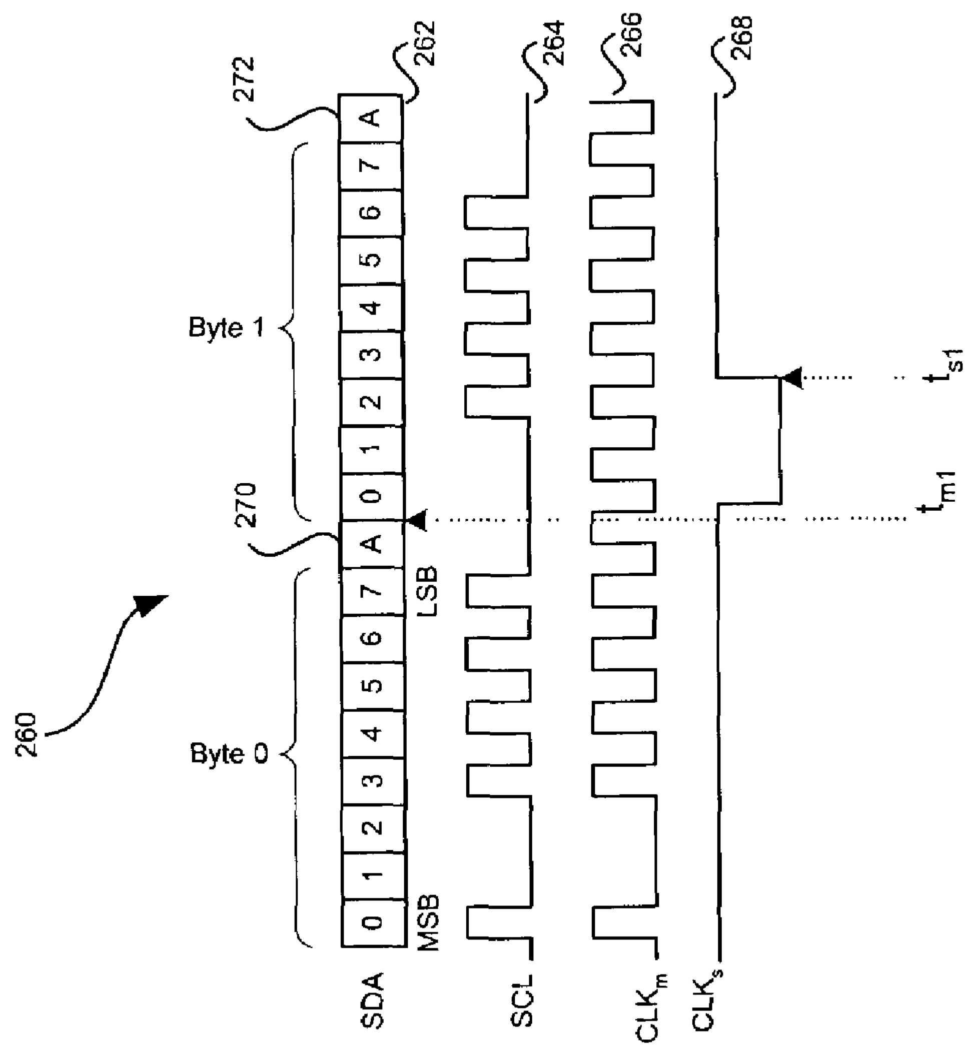
FIG. 2*c* is a timing diagram illustrating byte-level synchronization by a slave device.
Figure 3:
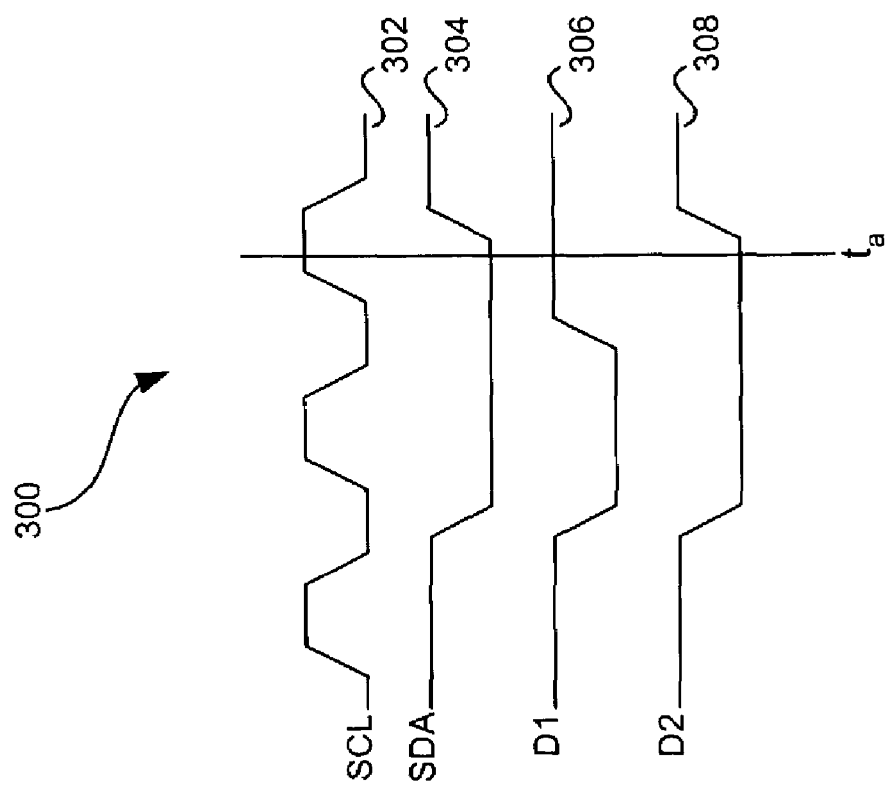
FIG. 3 is a timing diagram of an exemplary arbitration between two devices.
Figure 4:
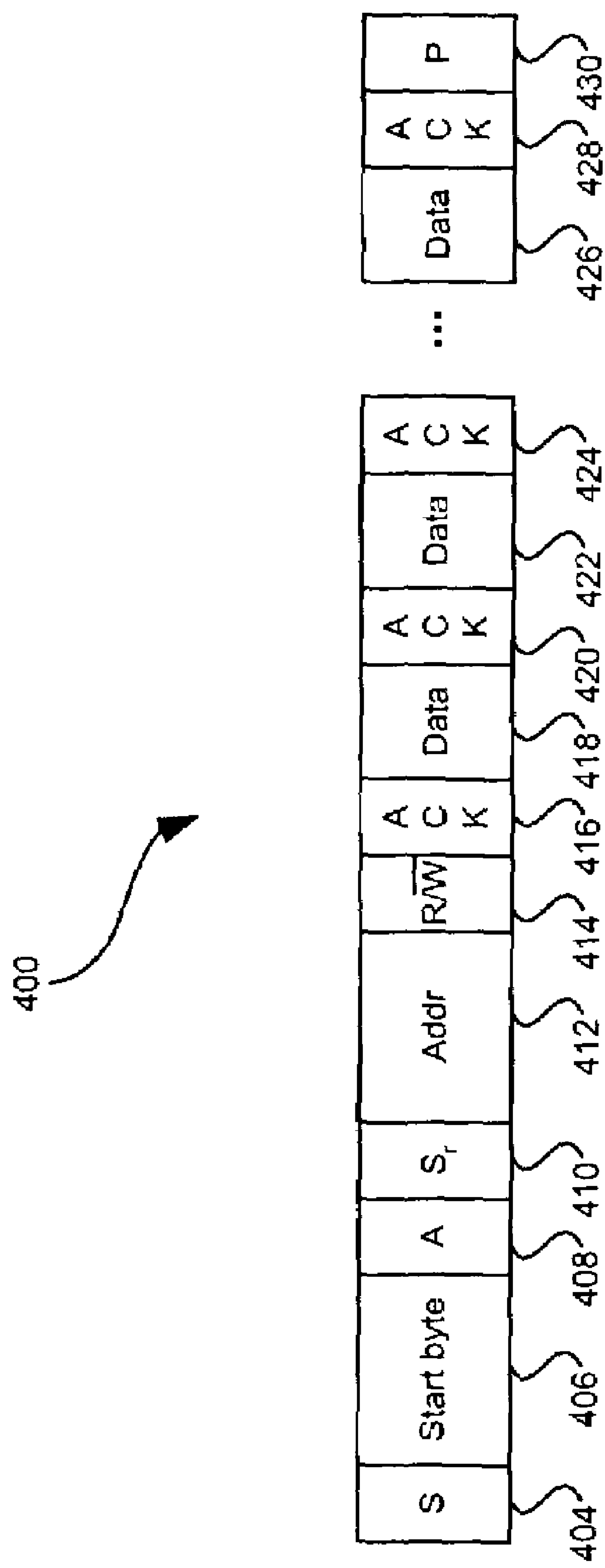
FIG. 4 is a diagram of data transfer format for an $I^2C$ bus operating in low-speed mode.
Figure 5:
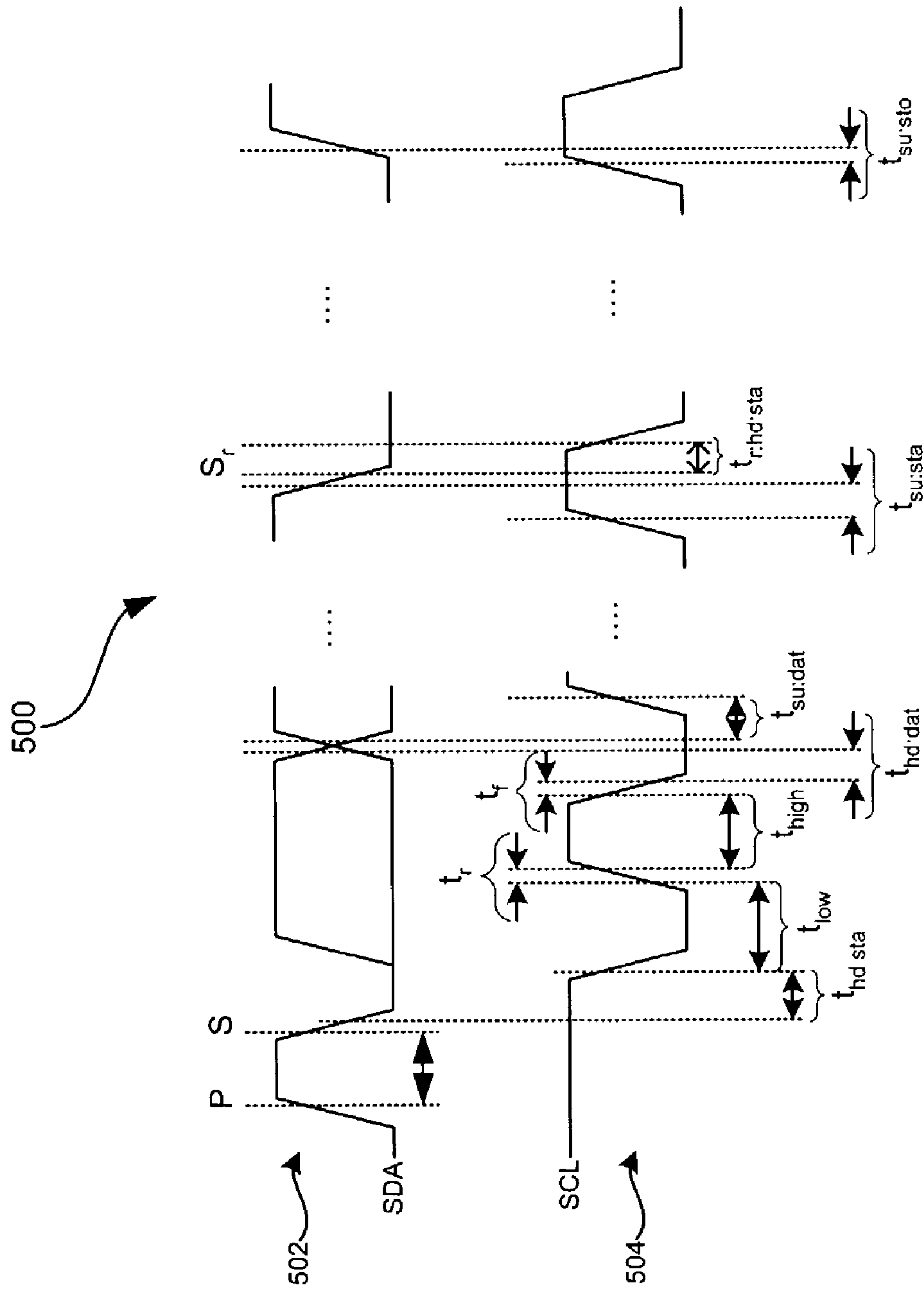
FIG. 5 is a timing diagram illustrating timing parameters for an $I^2C$ bus operating in normal mode.

In a case where the master device may be operating in a normal reset mode, upon determining that a specified one of the slave devices on bus 620 require resetting, the master device may be adapted to issue a start condition (S) 204 (FIG. 2*a*) in order to initiate a normal mode reset operation. The 7-bit address of the slave device requiring resetting may then be placed on bus 620 by the master device, the most significant bit of the slave address being placed on bus 620 first. The next bit placed on the bus 260 may be the read/write bit 214, which has a value set to logic zero (0) identifying the operation as a read operation. The master can then toggle the reset line (RST) 706 from logic zero (0) to logic one (1) in order to reset the slave device.

In a case where the master device may be operating in a forced reset mode, upon determining that one or more of the slave devices on bus 620 require resetting, the slave device may be adapted to toggle the reset line (RST) 706 from logic zero (0) to logic one (1) while the SCL and SDA lines are logic one (1) or high. In this regard, all the devices connected to bus 602 will be reset to a known state.

Figure 7:
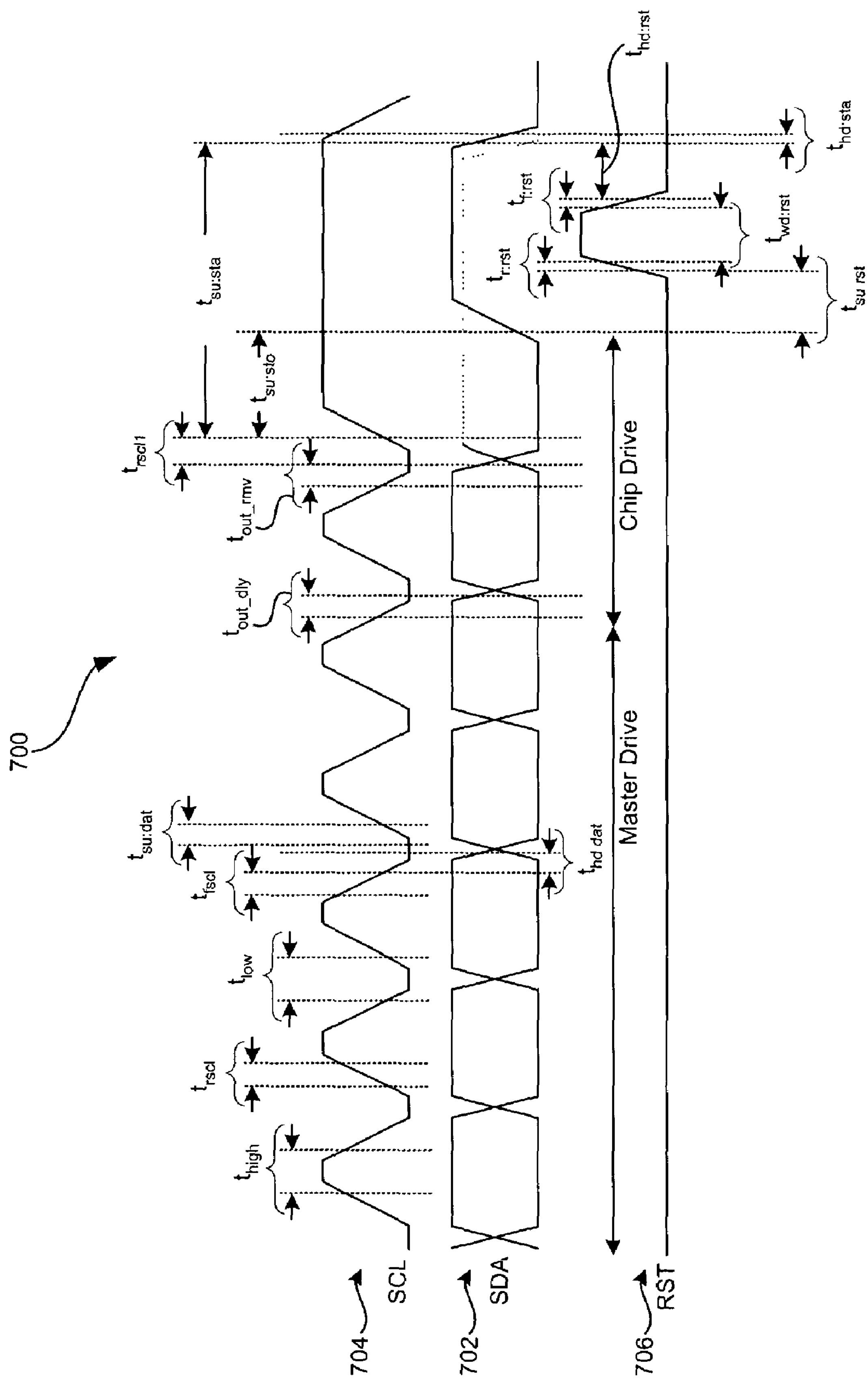
FIG. 7 is a timing diagram illustrating timing parameters for the transceiver bus of FIG. 6 in accordance with an embodiment of the invention

FIG. 7 is a timing diagram 700 illustrating timing parameters for the transceiver bus of FIG. 6 in accordance with an embodiment of the invention. Referring to FIG. 7, there is shown various portions of a SDA signal 702, a SCL signal 704 and a reset signal (RST) 706. The following parameters are shown in FIG. 7: $f_{scl}$, $t_{su:sta}$, $t_{hd:sta}$, $t_{low}$, $t_{high}$, $t_{su:dat}$, $t_{hd:dat}$, $t_{out\_dly}$, $t_{out\_rmv}$, $t_{rscl}$, $t_{rscl1}$, $t_{fscl}$, $t_{rsda,\,fsda}$, $t_{su:sto}$, $t_{su:rst}$, $t_{hd:rst}$, $t_{wd:rst}$, $t_{r:rst}$, $t_{f:rst}$, $C_b$, $V_{nl}$, $V_{nh}$.

The parameter $f_{scl}$ represents a frequency of the clock signal SCL 704. The parameter $t_{su:sta}$ represents the setup time for a repeated start condition ($R_s$). The parameter $t_{hd:sta}$ represents a hold time or a repeated start condition ($R_s$). The parameter $t_{low}$ represents a low period of clock signal SCL 704. The parameter $t_{high}$ represents a high period of clock signal SCL 704. The parameter $t_{su:dat}$ represents a data setup time for the master device driving bus 620. The parameter $t_{hd:dat}$ represents a data hold time for a master device driving bus 620. The parameter $t_{out\_dly}$ represents a data output delay required to drive a slave device. The parameter $t_{out\_rmv}$ represents a data output removal required to drive a slave device. The parameter $t_{rscl}$ represents a rise time of serial clock signal SCL 704. The parameter $t_{rscl1}$ represents a rise time for serial clock signal SCL 704 after a repeated start condition ($S_r$) and after an acknowledgement (ACK) bit. The parameter $t_{fscl}$ represents a fall time of serial clock signal SCL 704. The parameter $t_{rsda}$ represents a rise time for serial data signal SDA 702. The parameter $t_{rscl}$ represents a rise time of serial data signal SDA 702. The parameter $t_{fsda}$ represents a fall time for serial clock signal SDA. The parameter $t_{su:sto}$ represents a setup time for a stop condition (P). The parameter $t_{su:}$ represents a setup time of reset signal (RST) 706. The parameter $t_{hd:rst}$ represents a hold time of reset signal (RST) 706. The parameter $t_{wd:rst}$ represents a pulse width of reset signal (RST) 706. The parameter $t_{r:rst}$ represents a rise time for reset signal (RST) 706. The parameter $t_{f:rst}$ represents a fall time for reset signal (RST) 706. A capacitive load on the SCL and SDA lines is represented by $C_b$ and may be of the order of about 70 picofarads (pF).

The following table represents applicable maximum and minimum limits for each of the timing parameters shown in FIG. 7.

| Parameter | Min. Value | Max. Value | Unit |
|---|---|---|---|
| $f_{scl}$ | 0 | 5 | MHz |
| $t_{su:sta}$ | 160 | — | ns |
| $t_{hd:sta}$ | 160 | — | ns |

-continued

| Parameter | Min. Value | Max. Value | Unit |
|---|---|---|---|
| $t_{low}$ | 90 | — | ns |
| $t_{high}$ | 30 | — | ns |
| $t_{su:dat}$ | 10 | — | ns |
| $t_{hd:dat}$ | 10 | 40 | ns |
| $t_{out\_dly}$ | 15 | 40 | ns |
| $t_{out\_rmv}$ | 0 | 10 | ns |
| $t_{rscl}$ | 10 | 40 | ns |
| $t_{rscl1}$ | 10 | 40 | ns |
| $t_{fscl}$ | 10 | 40 | ns |
| $t_{rsda}$ | 10 | 40 | ns |
| $t_{fsda}$ | 10 | 40 | ns |
| $t_{su:sto}$ | 160 | — | ns |
| $t_{su:rst}$ | 20 | — | ns |
| $t_{hd:rst}$ | 20 | — | ns |
| $t_{wd:rst}$ | 20 | — | ns |
| $t_{r:rst}$ | 40 | — | ns |
| $T_{f:rst}$ | 40 | — | ns |
| $C_b$ | 70 | | pf |
| $V_{nl}$ | 0.1 $V_{dd}$ | — | V |
| $V_{nh}$ | 0.2 $V_{dd}$ | — | V |

In accordance with the various aspects of the invention, the transceiver bus may have a reduced maximum capacitive load (Cb) 70 pF compared to 100 pF for the convention $I^2C$ bus. Additionally, the clock frequency of SCL may be about 5.0 MHz compared to 3.4 MHz for the conventional $I^2C$ bus, thereby providing much faster performance. In order to maintain compatibility with other $I^2C$ bus compatible devices, the following parameters may remain the same-setup time for repeated start ($S_r$) $t_{su:sta}$, hold time for repeated start $t_{hd:sta}$, input data setup time $t_{su:dat}$, and input data hold time $t_{hd:dat}$. In order to avoid bus contention in cases where a master device may need to de-assert driving data, the parameter $t_{out\_drv}$ may be adapted to have a maximum value of about 40 ns and a minimum value of about 15 ns. In order to ensure that a master device gets off the bus in a timely manner in order to avert possible bus contentions, the data output delay from the slave device's point of view, $t_{out\_dly}$, may be set at a minimum value of 0 ns and a maximum value of about 10 ns. This may ensure that the master device may have enough time to de-assert the driving of data. The rise time of SCL, $t_{rscl}$, may have a maximum value of about 40 ns to ensure compatibility with conventional $I^2C$ bus parameters. This maximum rise time of about 40 ns for SCL may ensure compatibility with the higher bus speed of 5 MHz.

The rise time for SDA as input $t_{rsda\_l}$, may have a maximum value of about 40 ns in order to handle the increased bus speed. The fall time of SDA as input, $t_{fsda\_l}$, may have a maximum value of about 40 ns compared to 80 ns for the conventional $I^2C$ bus. The maximum fall time of SDA as input, $t_{fsda\_l}$, of about 40 ns may ensure proper handling of the increased bus speed. The maximum rise time of SDA as output, $t_{rsda\_o}$, of about 40 ns may ensure proper handling of the increased bus speed. Similarly, the maximum fall time of SDA as output, $t_{fsda\_o}$, of about 10 ns compared to 80 ns for the conventional $I^2C$ bus may also ensure proper handling of the increased bus speed. The setup time of the reset signal $t_{su:rst}$, has been assigned a new value of about 20 ns. This may ensure that the reset signal may occur during a bus idle period or frame. The hold time for the reset signal $t_{hd:ssb}$ may have a minimum value of about 20 ns. This may ensure that the reset signal occurs during a bus idle frame. The width of reset signal, $t_{wd:ssb}$, may have a minimum values of about 20 ns. This may ensure that the width of the reset signal is sufficiently wide to be recognized. Notwithstanding, it should be recognized that these values are exemplary values and accordingly, they may be altered without departing from the various aspects of the invention. For example, the values $t_{low}$ and $t_{high}$ among others, may vary dependent on a particular application Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for resetting at least one of a plurality of devices internally coupled in a communications system, the method comprising:

determining a status of the at least one of a plurality of devices coupled to a transceiver bus having a single serial data line, a single serial clock line and a single reset line;

resetting at least the at least one of a plurality of devices connected to the transceiver bus via said reset line, if said determined status of the at least one of a plurality of devices indicates that said at least one of a plurality of devices is unresponsive; and resetting the at least one of a plurality of devices connected to the transceiver bus via said reset line, if said determined status of the at least one of a plurality of devices indicates that said at least one of a plurality of devices is responsive but requires resetting.

2. The method according to claim 1, wherein said determining a status of the at least one of a plurality of devices comprises configuring one of the at least one of a plurality of devices coupled to said single serial data line, said single serial clock line and said reset line to operate as a master device.

3. The method according to claim 2, wherein said resetting said the at least one of a plurality of device comprises controlling said reset line by said master device to issue a reset signal to said at least said at least one of a plurality of device.

4. The method according to claim 3, wherein said controlling comprises toggling a logic value of said reset line while said data line and said clock line at logic one (1).

5. The method according to claim 2, wherein said resetting the at least one of a plurality of devices comprises controlling said reset line by said master device to issue a reset signal to said at least one of a plurality of devices.

6. The method according to claim 3, wherein said controlling comprises:

placing at least one address of the at least one of a plurality of devices on said data line;

instructing the at least one of a plurality of device to read data from said data line; and toggling a logic value of said reset line while said data line and said clock line at logic one (1).

7. The method according to claim 6, wherein said toggling comprises transitioning said reset line from logic zero (0) to logic one (1).

8. A system for resetting at least one of a plurality of devices internally coupled in a communications system, comprising:

at least one determinator for determining a status of the at least one of a plurality of devices coupled to a transceiver bus having a single serial data line, a single serial clock line and a single reset line;

at least one reset signal for resetting at least the at least one of a plurality of devices connected to the transceiver bus via said reset line, if said determined status of the at least one of a plurality of devices indicates that said at least one of a plurality of devices is unresponsive; and said at least one reset signal resetting the at least one of a plurality of devices connected to the transceiver bus via said reset line, if said determined status of the at least one of a plurality of devices indicates that said at least one of a plurality of devices is responsive but requires resetting.

9. The system according to claim 8, wherein said at least one determinator comprises at least one configurer for configuring one of the at least one of a plurality of devices coupled to said single serial data line, said single serial clock line and said reset line to operate as a master device.

10. The system according to claim 9, wherein said master device controls a reset signal on said reset line.

11. The system according to claim 10, wherein said master device comprises a toggler for toggling a logic value of said reset line while said data line and said clock line are at logic one (1).

12. The system according to claim 10, wherein said master device comprises:

at least one controller for placing at least one address of the at least one of a plurality of devices on said data line;

said at least one controller for instructing the at least one of a plurality of devices to read data from said data line; and a toggler for toggling a logic value of said reset line while said data line and said clock line at logic one (1).

13. A transceiver bus, comprising:

a single serial data line for communicating data signals between a plurality of devices coupled to the transceiver bus;

a single serial clock line coupled to each of said plurality of devices coupled to the transceiver bus, said clock line for communicating clock signals; and a single reset line coupled to at least a portion of said plurality of devices coupled to said single serial data line and said single serial clock line.

14. The transceiver bus according to claim 13, wherein one of said plurality of devices coupled to the transceiver bus is adaptively configured as a master device and a remaining portion of said plurality of devices coupled to the transceiver bus is adaptively configured as slave devices.

* * * * *